United States Patent
Coburn, IV

(10) Patent No.: US 11,184,426 B2
(45) Date of Patent: *Nov. 23, 2021

(54) CLOUD QUEUE TOMBSTONE

(71) Applicant: Sonos, Inc., Santa Barbara, CA (US)

(72) Inventor: Arthur L. Coburn, IV, Lexington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,684

(22) Filed: Oct. 14, 2019

(65) Prior Publication Data
US 2020/0045102 A1 Feb. 6, 2020

Related U.S. Application Data

(63) Continuation of application No. 15/681,675, filed on Aug. 21, 2017, now Pat. No. 10,447,771, which is a
(Continued)

(51) Int. Cl.
*H04L 29/08* (2006.01)
*G06F 16/27* (2019.01)
(Continued)

(52) U.S. Cl.
CPC ............ *H04L 67/10* (2013.01); *G06F 16/273* (2019.01); *G06F 16/4387* (2019.01);
(Continued)

(58) Field of Classification Search
CPC ... H04L 67/10; G06F 16/273; G06F 16/4387; H04N 21/2181; H04N 21/2408; H04N 21/242; H04N 21/26258; H04N 21/8113
See application file for complete search history.

(56) References Cited

U.S. PATENT DOCUMENTS

| | | |
|---|---|---|
| 5,406,634 A | 4/1995 | Anderson et al. |
| 5,440,644 A | 8/1995 | Farinelli et al. |
| | (Continued) | |

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

Anonymous, "Show currently playing song in playlist", The Spotify Community, 2013, 1 page.
(Continued)

*Primary Examiner* — Wing F Chan
*Assistant Examiner* — Billy H Ng
(74) *Attorney, Agent, or Firm* — Akerman LLP

(57) ABSTRACT

Example techniques relate to cloud queue tombstones. An example implementation may involve a computing system receiving instructions to remove a particular media item from a playback queue. Based on the instructions, the computing system removes the particular media item from the playback queue and adds, to the playback queue, a tombstone indicator indicating that the particular media item has been removed from the playback queue. The computing system receives, from the media playback system, a request for a window of one or more media items from the playback queue. Based on the request, the computing system sends, to the media playback system, data representing a particular window of media items from the playback queue, wherein the particular window includes the tombstone indicator. The computing system detects a given tombstone removal trigger from among multiple tombstone removal triggers and based on the detecting, removes the tombstone indicator from the playback queue.

20 Claims, 10 Drawing Sheets

Related U.S. Application Data continuation of application No. 14/485,261, filed on Sep. 12, 2014, now Pat. No. 9,742,839.

(51) Int. Cl.
| | |
|---|---|
| *G06F 16/438* | (2019.01) |
| *H04N 21/218* | (2011.01) |
| *H04N 21/24* | (2011.01) |
| *H04N 21/242* | (2011.01) |
| *H04N 21/262* | (2011.01) |
| *H04N 21/81* | (2011.01) |

(52) U.S. Cl.
CPC ....... *H04N 21/2181* (2013.01); *H04N 21/242* (2013.01); *H04N 21/2408* (2013.01); *H04N 21/26258* (2013.01); *H04N 21/8113* (2013.01)

(56) References Cited

U.S. PATENT DOCUMENTS

| | | | |
|---|---|---|---|
| 5,761,320 | A | 6/1998 | Farinelli et al. |
| 5,856,827 | A | 1/1999 | Sudo |
| 5,923,902 | A | 7/1999 | Inagaki |
| 6,002,862 | A | 12/1999 | Takaike |
| 6,032,202 | A | 2/2000 | Lea et al. |
| 6,181,316 | B1 | 1/2001 | Little et al. |
| 6,255,961 | B1 | 7/2001 | Van et al. |
| 6,256,554 | B1 | 7/2001 | Dilorenzo |
| 6,256,634 | B1* | 7/2001 | Moshaiov ........... G06F 16/2308 |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,728,531 | B1 | 4/2004 | Lee et al. |
| 6,732,155 | B2 | 5/2004 | Meek |
| 6,757,517 | B2 | 6/2004 | Chang et al. |
| 6,778,869 | B2 | 8/2004 | Champion |
| 6,826,283 | B1 | 11/2004 | Wheeler et al. |
| 6,985,694 | B1 | 1/2006 | De Bonet et al. |
| 7,017,118 | B1 | 3/2006 | Carroll |
| 7,020,048 | B2 | 3/2006 | McComas |
| 7,113,833 | B1 | 9/2006 | Brown et al. |
| 7,117,451 | B2 | 10/2006 | Sielken |
| 7,130,608 | B2 | 10/2006 | Hollstrom et al. |
| 7,130,616 | B2 | 10/2006 | Janik |
| 7,143,939 | B2 | 12/2006 | Henzerling |
| 7,187,947 | B1 | 3/2007 | White et al. |
| 7,236,773 | B2 | 6/2007 | Thomas |
| 7,295,548 | B2 | 11/2007 | Blank et al. |
| 7,312,785 | B2 | 12/2007 | Tsuk et al. |
| 7,358,960 | B2 | 4/2008 | Mak |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,725,533 | B2 | 5/2010 | Szeto et al. |
| 7,725,551 | B2 | 5/2010 | Szeto et al. |
| 7,742,740 | B2 | 6/2010 | Goldberg et al. |
| 7,805,682 | B1 | 9/2010 | Lambourne |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,050,652 | B2 | 11/2011 | Qureshey et al. |
| 8,074,253 | B1 | 12/2011 | Nathan |
| 8,103,009 | B2 | 1/2012 | McCarty et al. |
| 8,131,390 | B2 | 3/2012 | Braithwaite et al. |
| 8,204,890 | B1* | 6/2012 | Gogan ................ G06F 16/4387 707/748 |
| 8,234,395 | B2 | 7/2012 | Millington |
| 8,483,853 | B1 | 7/2013 | Lambourne |
| 8,682,722 | B1 | 3/2014 | Des et al. |
| 9,361,371 | B2 | 6/2016 | Coburn et al. |

| | | | |
|---|---|---|---|
| 2001/0042107 | A1 | 11/2001 | Palm |
| 2002/0002039 | A1 | 1/2002 | Qureshey et al. |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2002/0165921 | A1 | 11/2002 | Sapieyevski |
| 2002/0178191 | A1 | 11/2002 | Sielken |
| 2003/0023741 | A1 | 1/2003 | Tomassetti et al. |
| 2003/0157951 | A1 | 8/2003 | Hasty |
| 2003/0182315 | A1 | 9/2003 | Plastina et al. |
| 2003/0210796 | A1 | 11/2003 | McCarty et al. |
| 2004/0024478 | A1 | 2/2004 | Hans et al. |
| 2004/0025185 | A1 | 2/2004 | Goci et al. |
| 2004/0078383 | A1 | 4/2004 | Mercer et al. |
| 2004/0078393 | A1 | 4/2004 | Acree et al. |
| 2004/0078812 | A1 | 4/2004 | Calvert |
| 2004/0215611 | A1 | 10/2004 | Jawa et al. |
| 2004/0261040 | A1 | 12/2004 | Radcliffe et al. |
| 2005/0010666 | A1 | 1/2005 | Nanda et al. |
| 2005/0108320 | A1 | 5/2005 | Lord et al. |
| 2005/0166157 | A1 | 7/2005 | Ollis et al. |
| 2006/0107237 | A1 | 5/2006 | Kim |
| 2006/0168340 | A1 | 7/2006 | Heller et al. |
| 2006/0195480 | A1 | 8/2006 | Spiegelman et al. |
| 2006/0253782 | A1 | 11/2006 | Stark et al. |
| 2007/0038999 | A1 | 2/2007 | Millington |
| 2007/0142944 | A1 | 6/2007 | Goldberg et al. |
| 2007/0288470 | A1 | 12/2007 | Kauniskangas et al. |
| 2008/0005690 | A1 | 1/2008 | Van Vugt |
| 2008/0016465 | A1 | 1/2008 | Foxenland |
| 2008/0109494 | A1 | 5/2008 | Chitre et al. |
| 2008/0250073 | A1 | 10/2008 | Nori et al. |
| 2009/0077263 | A1* | 3/2009 | Koganti ................ G06F 16/27 709/248 |
| 2009/0089313 | A1 | 4/2009 | Cooper et al. |
| 2009/0228919 | A1 | 9/2009 | Zott et al. |
| 2010/0198767 | A1 | 8/2010 | Farrelly |
| 2010/0299402 | A1 | 11/2010 | Korman et al. |
| 2011/0055901 | A1 | 3/2011 | Karaoguz et al. |
| 2012/0284423 | A1 | 11/2012 | Weel et al. |
| 2012/0311618 | A1 | 12/2012 | Blaxland et al. |
| 2013/0159858 | A1 | 6/2013 | Joffray et al. |
| 2014/0006348 | A1 | 1/2014 | Akinyemi |
| 2014/0075308 | A1 | 3/2014 | Sanders et al. |
| 2014/0297729 | A1 | 10/2014 | Wormington et al. |
| 2015/0288692 | A1 | 10/2015 | Wei |
| 2015/0347440 | A1 | 12/2015 | Habouzit et al. |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Office Action dated Aug. 3, 2017, issued in connection with EP Application No. 15778792.0, 8 pages.
European Patent Office, Office Action dated Jan. 16, 2017, issued in connection with European Application No. 15778792.0, 7 pages.
European Patent Office, Summons to Attend Oral Proceedings mailed on Mar. 12, 2018, issued in connection with European Patent Application No. 15778792.0, 8 pages.
First Action Interview Office Action dated Mar. 23, 2017, issued in connection with U.S. Appl. No. 14/485,261, filed Sep. 12, 2014, 11 pages.
International Searching Authority, International Search Report and Written Opinion dated Nov. 23, 2015, issued in connection with International Application No. PCT/US2015/049763, dated Sep. 17, 2015, 14 pages.

(56) References Cited

OTHER PUBLICATIONS

International Searching Authority, International Search Report dated Aug. 21, 2014, issued in connection with International Application No. PCT/US2014/034290, filed on Apr. 16, 2014, 3 pages.

International Searching Authority, Written Opinion dated Mar. 14, 2017, issued in connection with International Application No. PCT/US2015049763, filed on Sep. 11, 2015, 8 pages.

International Searching Authority, Written Opinion dated Aug. 21, 2014, issued in connection with International Application No. PCT/US2014/034290, filed on Apr. 16, 2014, 5 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Mardell, Jimmy, "Playlists at Spotify—Using Cassandra to store version controlled objects at large scale", Cassandra Summit Europe 2013, 2013, XP055228219, 37 pages.

Motorola, "Simplefi, Wireless Digital Audio Receiver, Installation and User Guide," Dec. 31, 2001, 111 pages.

Notice of Allowance dated May 30, 2017, issued in connection with U.S. Appl. No. 14/485,261, filed Sep. 12, 2014, 17 pages.

Notice of Allowance dated May 31, 2019, issued in connection with U.S. Appl. No. 15/681,675, filed Aug. 21, 2017, 10 pages.

Palm, Inc., "Handbook for the Palm VII Handheld," May 2000, 311 pages.

Preinterview First Office Action dated Feb. 8, 2017, issued in connection with U.S. Appl. No. 14/485,261, filed Sep. 12, 2014, 9 pages.

Presentations at WinHEC 2000, May 2000, 138 pages.

PRISMIQ, Inc., "PRISMIQ Media Player User Guide," 2003, 44 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

\* cited by examiner

← 800A

| PLAYBACK QUEUE | |
|---|---|
| MEDIA ITEM | POSITION |
| Song A | 1 |
| Song B | 2 |
| Song C | 3 |
| Song D | 4 |
| Song E | 5 |
| Song F | 6 |
| Song G | 7 |
| Song H | 8 |
| Song I | 9 |
| Song J | 10 |
| Song K | 11 |
| Song L | 12 |
| Song M | 13 |
| Song N | 14 |
| Song O | 15 |
| Song P | 16 |

| PLAYBACK QUEUE ||
| --- | --- |
| MEDIA ITEM | POSITION |
| Song A | 1 |
| Song B | 2 |
| Song D | 4 |
| Song E | 5 |
| Song F | 6 |
| Song G | 7 |
| Song H | 8 |
| Song I | 9 |
| Song J | 10 |
| Song K | 11 |
| Song L | 12 |
| Song M | 13 |
| Song N | 14 |
| Song O | 15 |
| Song P | 16 |

| PLAYBACK QUEUE ||
|---|---|
| MEDIA ITEM | POSITION |
| Song A | 1 |
| Song B | 2 |
| <deleted: Song C> | 3 |
| Song D | 4 |
| Song E | 5 |
| Song F | 6 |
| Song G | 7 |
| Song H | 8 |
| Song I | 9 |
| Song J | 10 |
| Song K | 11 |
| Song L | 12 |
| Song M | 13 |
| Song N | 14 |
| Song O | 15 |
| Song P | 16 |

FIGURE 8C

| PLAYBACK QUEUE | |
|---|---|
| MEDIA ITEM | POSITION |
| Song A | 1 |
| Song B | 2 |
| <deleted: Song C> | 3 |
| <deleted: Song D> | 4 |
| Song E | 5 |
| Song F | 6 |
| Song G | 7 |
| Song H | 8 |
| Song I | 9 |
| Song J | 10 |
| Song K | 11 |
| Song L | 12 |
| Song M | 13 |
| Song N | 14 |
| Song O | 15 |
| Song P | 16 |

FIGURE 8D

| PLAYBACK QUEUE ||
| MEDIA ITEM | POSITION |
| --- | --- |
| Song A | 1 |
| Song B | 2 |
| Song E | 3 |
| Song F | 4 |
| Song G | 5 |
| Song H | 6 |
| Song I | 7 |
| Song J | 8 |
| Song K | 9 |
| Song L | 10 |
| Song M | 11 |
| Song N | 12 |
| Song O | 13 |
| Song P | 14 |

FIGURE 8E

CLOUD QUEUE TOMBSTONE

CROSS REFERENCE TO RELATED APPLICATIONS

This application claims priority under 35 U.S.C. § 120 to, and is a continuation of, U.S. Non-Provisional patent application Ser. No. 15/681,675, filed on Aug. 21, 2017, entitled "Cloud Queue Item Removal," which is incorporated herein by reference in its entirety.

U.S. Non-Provisional patent application Ser. No. 15/681,675 claims priority under 35 U.S.C. § 120 to, and is a continuation of, U.S. Non-Provisional patent application Ser. No. 14/485,261, filed on Sep. 12, 2014, entitled "Cloud Queue Item Removal," issued as U.S. Pat. No. 9,742,839 on Aug. 22, 2017, which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 8A is an example playback queue;

FIG. 8B is an instance of the example playback queue in which a media item is removed from the queue;

FIG. 8C is an instance of the example playback queue in which an indication that the media item was removed is added to the playback queue;

FIG. 8D is an instance on the example playback queue in which indications that two media items were removed from the queue are added to the playback queue; and FIG. 8E is an instance of the example playback queue in which the indications are removed from the playback queue.

Figure 1:
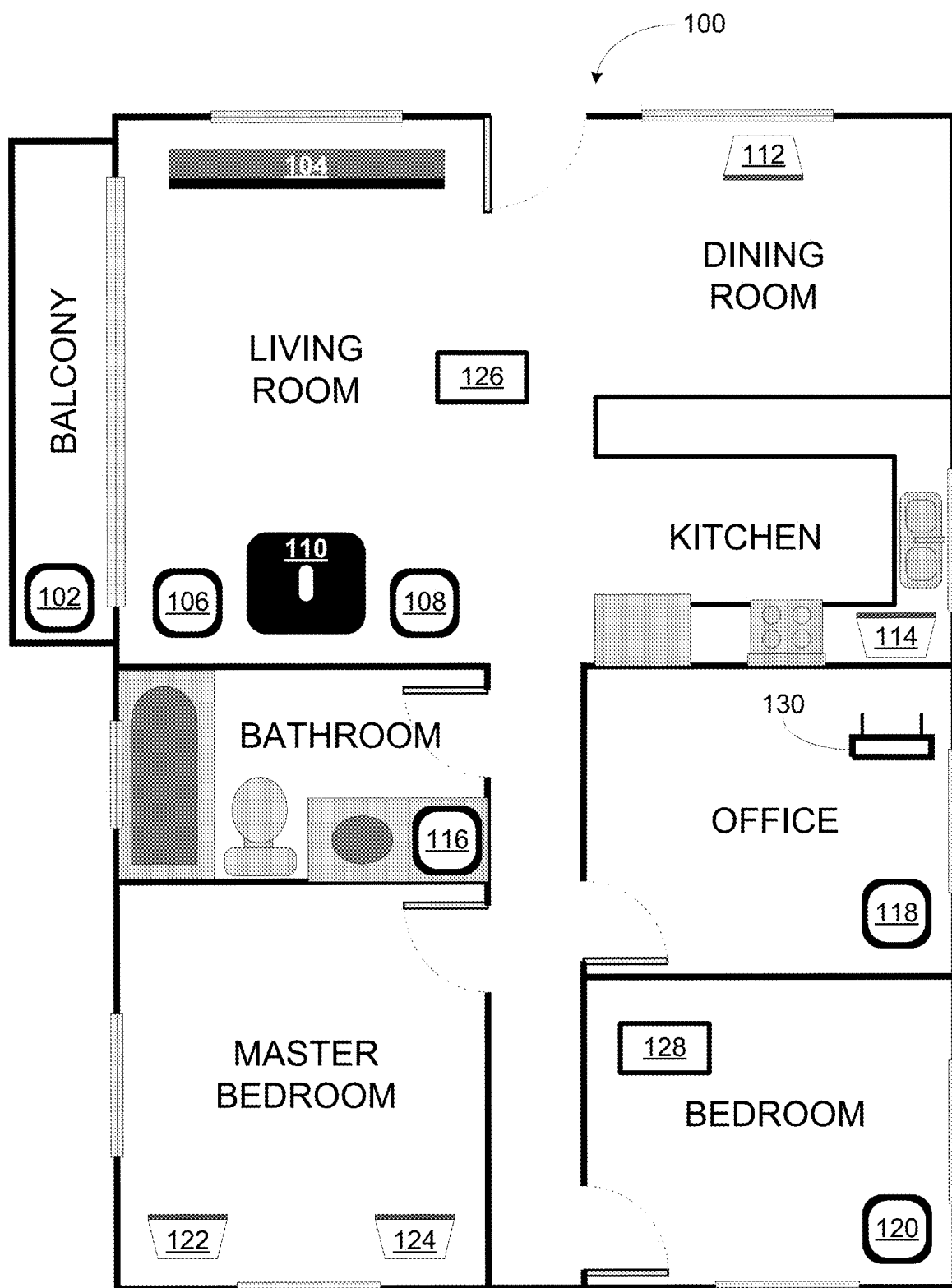
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some examples described herein involve, inter alia, removing a media item from a cloud queue. Such examples assist in maintaining consistency between a cloud-based audio queue and one or more copies (e.g., a representation or other indication) of the cloud-based audio queue that are maintained by a media playback system (e.g., by one or more playback devices of the media playback system).

In some examples, a computing system may maintain or have access to a cloud-based playback queue of media items. Such a computing system may assist in providing a cloud service. One aspect of the cloud service may involve providing a media playback system access to the cloud-based playback queue. The media playback system and the computing system may exchange messages to maintain consistency between the cloud-based playback queue and one or more copies of the playback queue that are maintained by the media playback system. As different techniques for representing playback queues exist, such copies may be copies of the information contained in the respective queues (e.g., the media items queued and their ordering) and not necessarily exact duplicates of the queues themselves. For instance, when the cloud-based playback queue is altered (e.g., a media item is added, removed, or re-arranged), the computing system may notify the media playback system that the cloud-based playback queue has been altered, perhaps by sending a message to the media playback system via a network interface. Based on receiving such a message, the media playback system may send a request for one or more media items from the cloud-based playback queue so as to synchronize its copy of the cloud-based playback queue (or a part thereof) with the cloud-based playback queue. The computing system may then respond with a list of media items from the cloud-based playback queue.

From time to time, the computing system may remove a given media item from the cloud-based playback queue, perhaps based on a message received from another device via a network interface instructing the computing system to remove the media item. In such a case, the computing system may add to the queue an indication that the given media item has been removed from the queue. Such an indication may be sent to the media playback system, perhaps as part of a response to a request for one or more media items.

Further, the computing system may maintain the indication in the cloud-based playback queue until one or more conditions have been satisfied. Maintaining the indication may be advantageous in some circumstances. For example, if the indication is not maintained, and if the media playback system does not receive the notification that the cloud-based playback queue has been altered (or if the notification is not sent), the media playback system might not ever receive notification of the alteration of the cloud-based playback queue. However, if the indication is maintained, the media playback system may later receive the indication in a message (e.g., in a subsequent request for media items) and, based on the indication, detect that the media item has been removed from the cloud-based playback queue.

Such conditions may involve receiving more than a threshold number of requests for one or more media items. For instance, after adding the indication (that the given media item has been removed) to the cloud-based playback queue, the computing system may receive one or more requests for one or more media items from the cloud-based playback queue. After receiving more than the threshold number of requests, the computing system may remove the indication from the queue. Maintaining the indication until the computing system has received more than the threshold number of requests increases the likelihood that the media playback system has detected that the given media item has been removed. For instance, as the number of requests increases, so too does the probability that an indication that the media item has been removed has been included in at least one of the lists of media items sent to the media playback system. Other examples of such conditions exist.

As indicated above, the present application involves removing a media item from a playback queue. In one aspect, a method is provided. The method may involve removing a given media item from a queue of media items. The method may further involve adding to the queue an indication that the given media item has been removed from the queue. After receiving the one or more requests, the method may also involve determining that the computing system has received more than a threshold number of requests for one or more media items since adding to the queue the indication. After determining that the computing system has received more than the threshold number of requests, the method may further involve removing the indication from the queue.

In another aspect, a device is provided. The device includes a network interface, at least one processor, a data storage, and program logic stored in the data storage and executable by the at least one processor to perform functions. The functions may include removing a given media item from a queue of media items. The functions may further include adding to the queue an indication that the given media item has been removed from the queue. After receiving the one or more requests, the functions may also include determining that the computing system has received more than a threshold number of requests for one or more media items since adding to the queue the indication. After determining that the computing system has received more than the threshold number of requests, the functions may further include removing the indication from the queue.

In yet another aspect, a non-transitory computer readable memory is provided. The non-transitory computer readable memory has stored thereon instructions executable by a computing device to cause the computing device to perform functions. The functions may include removing a given media item from a queue of media items. The functions may further include adding to the queue an indication that the given media item has been removed from the queue. After receiving the one or more requests, the functions may also include determining that the computing system has received more than a threshold number of requests for one or more media items since adding to the queue the indication. After determining that the computing system has received more than the threshold number of requests, the functions may further include removing the indication from the queue.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
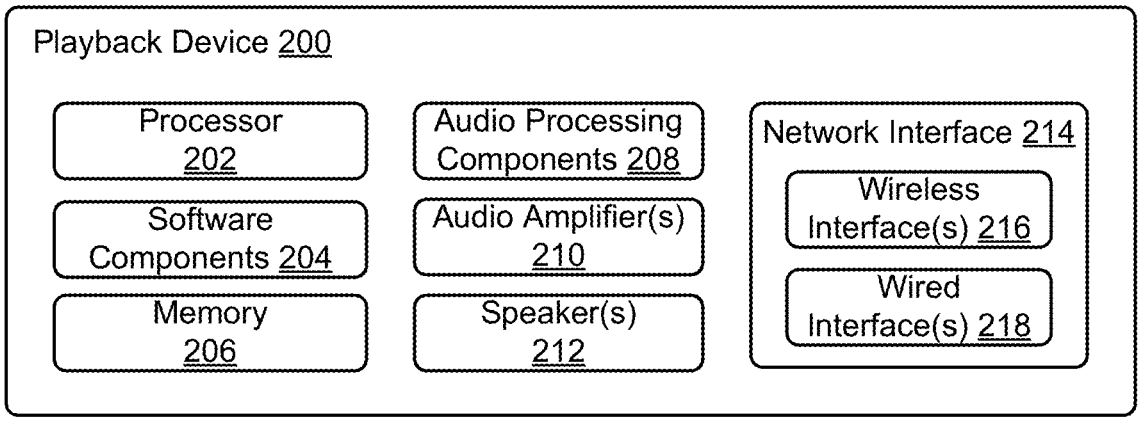
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
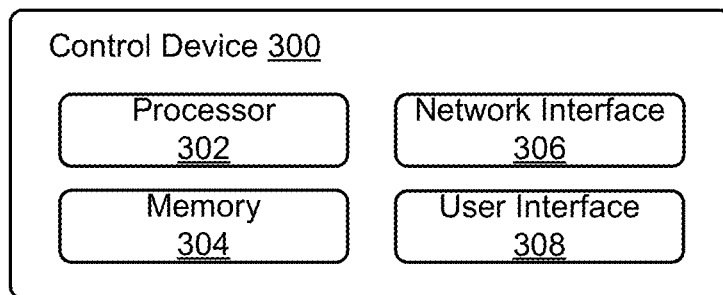
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
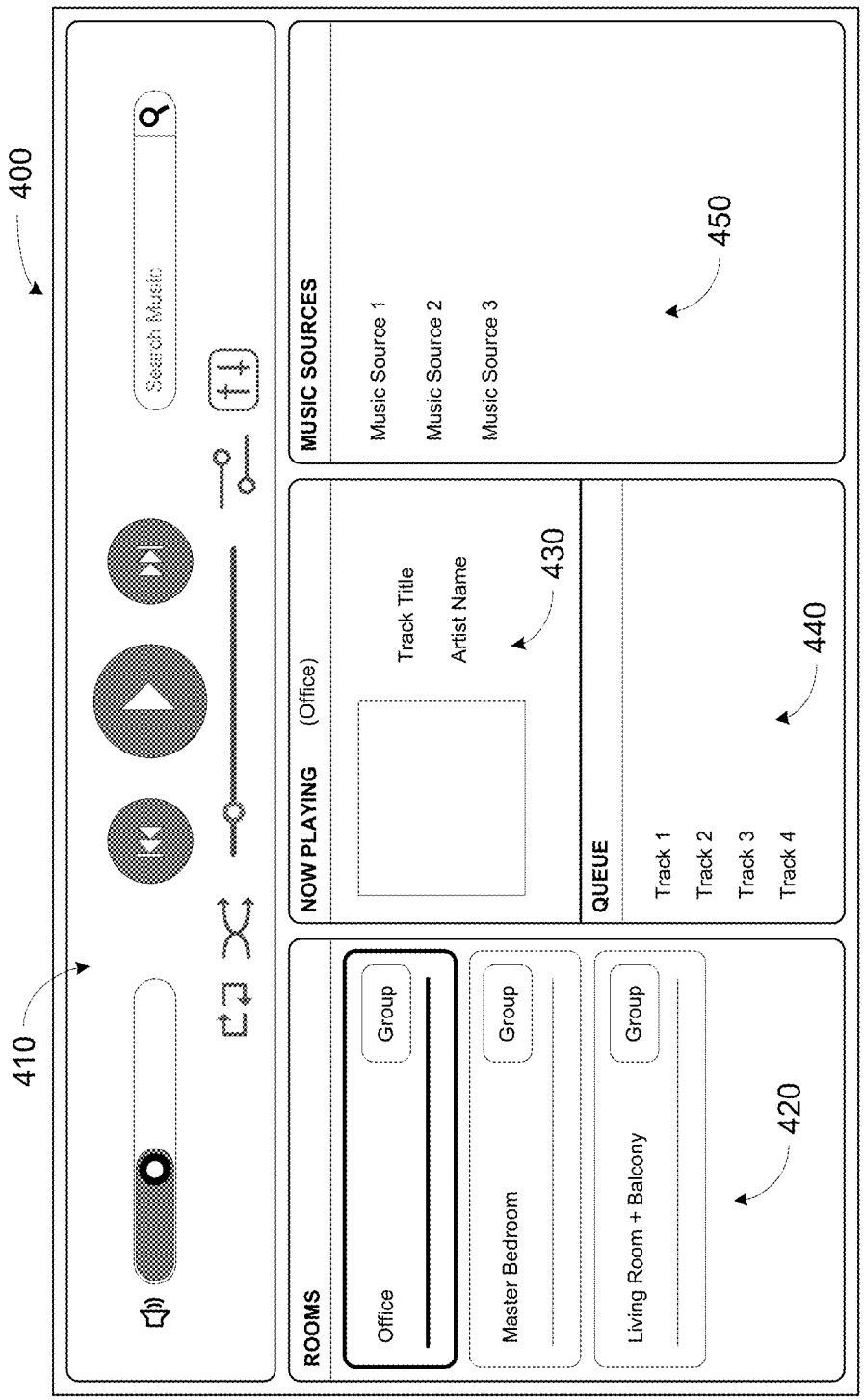
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Cloud Computing Functions

Various references are made herein to "cloud computing." The term "cloud computing" is used to refer to services delivered using distributed computing over a network, such as the Internet. A non-exhaustive list of services delivered via the cloud include electronic mail (e.g., GMAIL® or HOTMAIL®), social networking (e.g., FACEBOOK®, LINKEDIN®, or TWITTER®), file hosting (e.g., DROPBOX®), and streaming audio (e.g., SPOTIFY®, PANDORA®, or BEATSAUDIO®). Other cloud services are certainly offered as well.

Cloud service providers may offer one or more interfaces for accessing their service over a network. For instance, some cloud services may be accessed by visiting a web site using a web browser. Other cloud services are accessed by executing a particular application specific to the cloud service on a computing device. Some cloud services may offer an application programming interface (API) to facilitate access to the service by a third-party web site or application. In many cases, a user who has access to a given cloud service can access the service from any computing device that is connected to the network, provided that the computing device has a supported interface to the cloud service.

In one instance, accessing a cloud service may involve accessing, with a first computing device (i.e., a client), a second computing device (i.e., a server). Example client devices may include playback device 200 of FIG. 2, or control device 300 of FIG. 3, among other possible devices. One or more programs or applications (i.e., instructions) may execute on the server to perform computing tasks supported by the cloud service. The client may send various commands to the server to instruct the server to perform the computing tasks supported by the cloud service.

Figure 5:
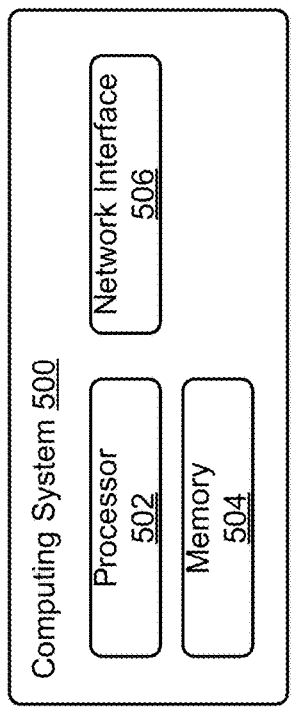
FIG. 5 shows an computing system that may practice certain embodiments.

FIG. 5 illustrates an example computing system 500 that may provide a cloud service to one or more users. Example computing system 500 includes at least one processor 502, memory 504, and a network interface 506. The memory 504 may contain instructions executable by the processor 502 to perform computing tasks supported by a cloud service. The computing device 500 may communicate with other computing devices via the network interface 506.

In aggregate, the provision of a cloud service many involve multiple instances of computing system 500. Each instance of computing system 500 may provide the cloud service to one or more users. Cloud service providers may scale the number of instances of computing system 500 involved in providing the cloud service based on user demand.

Figure 6:
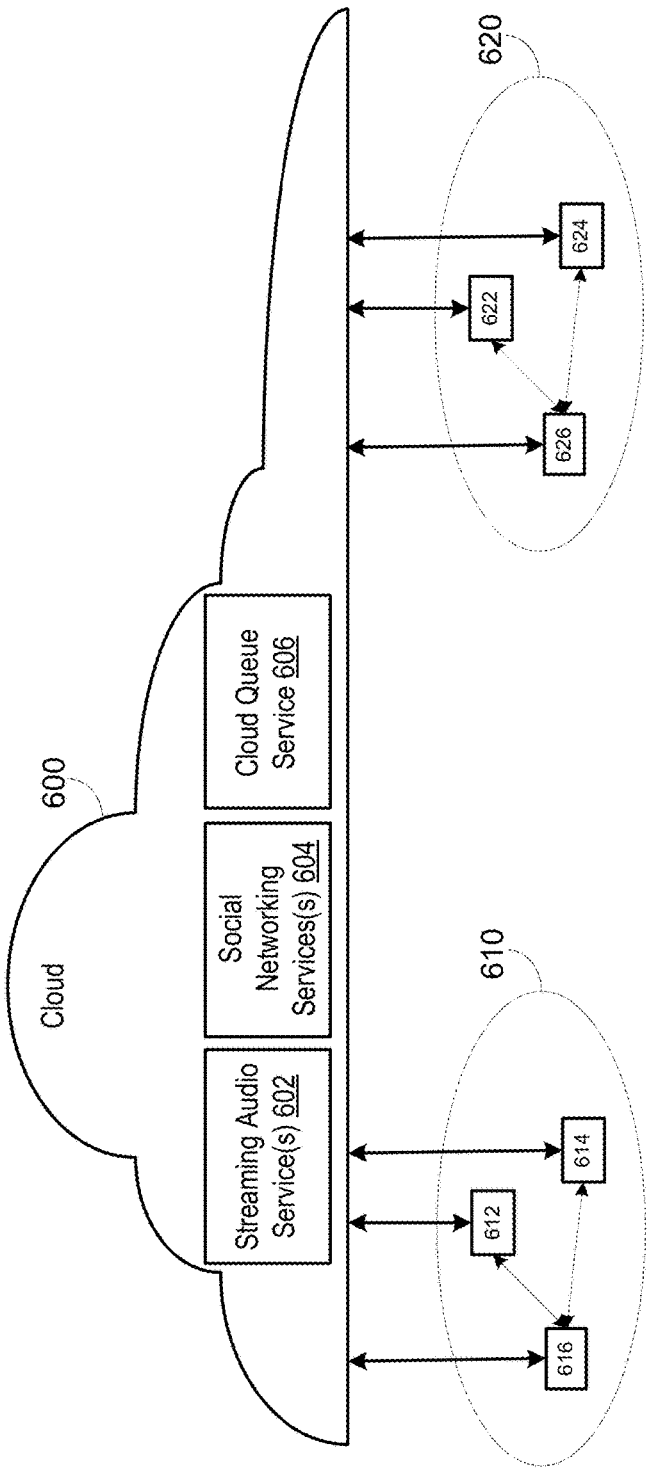
FIG. 6 shows an example cloud computing system in which certain embodiments may be practiced.

FIG. 6 illustrates an example cloud 600. The example cloud 600 may include any number of computing devices which are interconnected via one or more networks. For instance, cloud 600 may include one or more instances of computing system 500. As shown in FIG. 6, media playback systems 610 and 620 are connected to cloud 600. In particular, media playback system 610 includes playback devices 612 and 614 and control device 616, each having a respective connection to cloud 600. Likewise, media playback system 620 includes playback devices 622 and 624 and control device 626, each having a respective connection to cloud 600.

Using the cloud 600, media playback systems 610 and 620 may access various cloud services. For instance, media playback systems 610 and 620 may also access one or more streaming audio services 602. As noted above, streaming audio services may provide audio content to media playback systems. Several example streaming audio services that are currently available include SPOTIFY®, PANDORA®, BEATSAUDIO®, RDIO®, GOOGLE PLAY MUSIC ALL ACCESS®, SONY MUSIC UNLIMITED®, ITUNES RADIO®, XBOX MUSIC®, and TUNEIN RADIO®. Other streaming audio services certainly exist, and other streaming audio services may be offered in the future.

Media playback systems 610 and 620 may also access one or more social network services 604. Social network services are often characterized at least in part by various links between users of the service. Such links are referred to by different names, such as "friends", "connections", "followers", or "favorites," among other examples. Users may create such links for various reasons. For instance, in some cases, the users may have a relationship outside of the social network (e.g., co-workers, relatives, or college friends). In other cases, two users may have similar interests (e.g., fans of a particular band or genre) or belong to a certain group and then form a link in the social network because they share these similar interests.

A cloud service provider may provide a cloud queue service 606. The cloud queue service 606 may maintain or have access to one or more playback queues. In some cases, the cloud queue service 606 may maintain a playback queue for each media playback system registered with the cloud queue service 606. Such playback queues may be referred to as cloud queues. In other cases, the cloud queue service 606 may maintain multiple cloud queues for each media playback system, perhaps with one particular playback queue "active" (i.e., "selected") at any instant.

Various devices may access the playback queue to modify (e.g., add, remove, or re-order) media items in a playback queue maintained by cloud queue service 606. Such devices may include control devices, such as control device 300, or any suitable device having a network interface to communicate with the cloud queue service 606. Access to particular playback queues may be limited to devices that are authenticated, authorized, or otherwise associated with a particular media playback system. For instance, a media playback system may be associated with one or more user accounts. Authenticating a device with the cloud queue service 606 by way of one of these one or more user accounts may allow the device to modify a playback queue maintained for the media playback system.

A media playback system, such media playback systems 610 and 620, may request media items from a cloud queue maintained for the media playback system by a cloud queue service. For instance, media playback system 610 may request media items from a particular cloud queue maintained for media playback system 610 by cloud queue service 606. In some implementations, the media playback system may maintain a copy (or snapshot) of the cloud queue. The media playback system may play back media items from this copy.

From time to time, the media playback system may request media items from the cloud queue to update its copy of the cloud queue. For instance, media playback system 610 may request media items from the particular cloud queue maintained for media playback system 610 to update its local instance of the cloud queue, perhaps stored on a memory of a playback device, such as memory 206 of playback device 200. Further, in some examples, cloud queue service 606 may notify media playback system 610 of changes to the particular cloud queue (e.g., addition, removal, or re-ordering of media items in the particular cloud queue). Based on such a notification, media playback system 610 may request media items from the particular cloud queue maintained for media playback system 610 to update its local instance of the cloud queue.

The above discussions relating to playback devices, controller devices, playback zone configurations, media content sources, and cloud computing provide only some examples of operating environments within which functions and methods described below may be implemented. Other operating environments and configurations of media playback systems, playback devices, and network devices not explicitly described herein may also be applicable and suitable for implementation of the functions and methods.

III. Example Method/System to Remove Media Items from a Playback Queue

As discussed above, embodiments described herein may involve removing media items from a playback queue.

Figure 7:
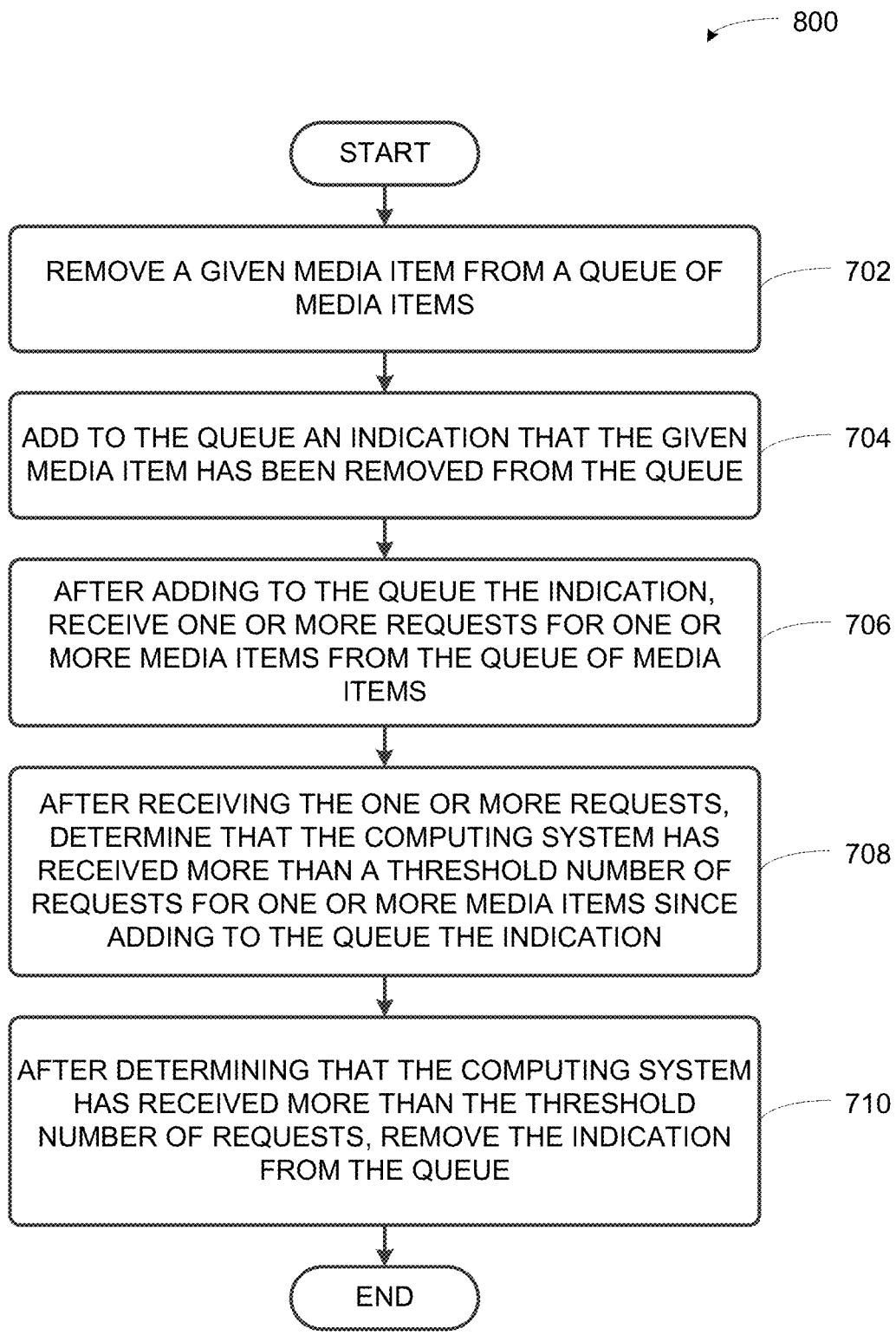
FIG. 7 is an example flow diagram for removing a media item from a queue.

Method 700 shown in FIG. 7 presents an embodiment of a method that can be implemented within an operating environment involving, for example, the media playback system 100 of FIG. 1, one or more of the playback device 200 of FIG. 2, one or more of the control device 300 of FIG. 3, or one or more of the computing system 500 of FIG. 5. Method 700 may include one or more operations, functions, or actions as illustrated by one or more of blocks 702-710. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 8 may represent circuitry that is wired to perform the specific logical functions in the process.

a. Remove a Given Media Item from a Queue of Media Items

At block 702, the method involves removing a given media item from a queue of media items. For instance, a computing system, such as computing system 500 of FIG. 5, may remove a given media item from a queue maintained by a cloud queue service, such as cloud queue service 606.

FIG. 8A shows example playback queue 800A. Playback queue 800A is a list of entries 802-832. Entries 802-832 contain Songs A-P in positions 1-16, respectively. Songs A-P may represent any of the example audio items noted above. Although playback queue 800A is shown with 15 entries, playback queue 800A may have additional or fewer entries if media items are added or removed from playback queue 800A. Playback queue 800A may be maintained for a media playback system by a cloud queue service, such as cloud queue service 606. For example, an instance of computing system 500 of FIG. 5 (which may provide cloud queue service 606) may maintain playback queue 800A for media playback system 610. In such an example, playback device 612 and/or playback device 616 may maintain a local copy of playback queue 800A, perhaps in a memory, such as memory 206 of FIG. 2. Alternately, playback queue 800A may be maintained on another computing system, such as an instance of control device 300 of FIG. 3.

As noted above, a local copy of a playback queue is not necessarily the playback queue itself, or a copy of the queue per se. The local copy of the playback queue may represent information of the playback queue. For instance, the local copy of playback queue 800A may include data that represent entries 802-832 (containing Songs A-P in positions 1-16), such that, based on the local copy, the media playback system may detect the media items queued in playback queue 800A and the ordering thereof.

In one example, the computing system may remove song C in position 3 from entry 806 in queue 800A. FIG. 8B shows example playback queue 800B, which represents playback queue 800A after the computing system removed song C in position 3 from entry 806.

In some examples, the computing system may receive, via a network interface, a command to remove the given media item from the queue of media items. Such a command may be sent from a device that is communicatively coupled to the computing system via a network. In some cases, the device may detect input at a user interface that indicates a selection of one or more media items for removal from the queue. For instance, control device 616 of FIG. 6 may detect input selecting song C in position 3 for removal from the queue. Based on the received command to remove the given media item (e.g., in response to the received command), the computing system may remove the given media item from the queue of media items.

As noted above, the computing system may receive a command to remove the given media item from the queue of media items. In some implementations, based on such a received command, the computing system may send, via the network interface, at least one message that indicates that the queue of media items has been altered. For instance, the computing system may send a message to playback device 612, which may be a zone "coordinator" that stores a local copy of the playback queue on behalf of the zone that other playback devices in the zone (e.g., playback device 614) may access. Alternatively, the computing system may send the message to multiple playback devices within a group (e.g., playback device 612 and 614). Such a message may notify that playback devices that their respective local copies of playback queue 800A are out-of-date (as removal of song C has altered playback queue 800A). In some cases, the computing system may broadcast the message to all playback devices in a media playback system. In other cases, the computing system may send the message to one or more playback devices, which may then send an indication that the queue of media items has been altered to other playback devices of the media playback system.

b. Add to the Queue an Indication that the Given Media Item has been Removed from the Queue At block 704, the method involves adding to the queue an indication that the given media item has been removed from the queue. For instance, the computing system may add an indication to queue 800B that Song C has been removed from queue 800B. Such an indication may be referred to as a "tombstone."

Adding an indication that the given media item has been removed from the queue may be implemented in a variety of ways. In some cases, a table, array, or other data structure that represents the queue may contain entries or other containers that represent the media items in the queue. In such an example, adding to the queue an indication that the given media item has been removed from the queue may involve adding to the queue an entry that indicates that the given media item has been removed from the queue. FIG. 8C shows example playback queue 800C, which represents playback queue 800B after adding, to queue 800B, the indication that Song C has been removed from queue 800B.

As shown, queue 800C includes an entry 806 that indicates that Song C has been removed from the queue. The entry may indicate a position of the given media item in the queue of media items before the given media item was removed (i.e., position 3 for Song C).

In another example, adding to the queue the indication may involve associating data (indicating that the given media item has been removed from the queue) with the queue. For instance, the playback queue may include metadata that may indicate media items that have been removed from the queue. Alternatively, the playback queue may contain a reference to (or be otherwise associated with) data that may indicate media items that have been removed from the queue.

In some examples, each media item in the queue of media items is assigned a unique identifier. The unique identifier may be a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. The removed item may have previously been assigned a given unique identifier (e.g., a URI indicating the removed item). In such cases, adding to the queue an indication that the given media item has been removed from the queue may involve adding an entry to the queue that indicates the given identifier such that the entry indicates the removed media item via the given identifier. For example, Song C may be assigned a particular URI, and entry 806 that indicates that Song C has been removed from the queue may indicate Song C by the particular URI assigned to Song C.

c. Receive One or More Requests for One or More Media Items from the Queue of Media Items At block 706, the method involves receiving one or more requests for one or more media items from the queue of media items. For instance, after adding to the queue the indication, the computing system may receive one or more requests for one or more media items from playback queue 800C. In some examples, the requests may be sent from one or more playback devices, such as playback device 612 and/or 614. As noted above, playback devices may send requests for one or more media items to the cloud queue service to update their respective copies of playback queue 800C. Alternatively, a control device, such as control device 616, may send one or more of the requests.

As noted above, a device of a media playback system may make such a request to synchronize a local copy of the playback queue (or a portion thereof) with the playback queue. Accordingly, each request for one or more media items may be a request for one or more media items in a list from the playback queue. The one or more media items requested may include a media item that is currently playing at the media playback system (and perhaps one or more media items queued after the currently playing media item such that the media items that are queued next in the playback queue can be synced to the local queue for playback at the media playback system). For instance, a particular media item (e.g., Song A) may be playing on media playback system 610 from a local copy of queue 800A. Playback device 612 (or playback device 614) may request a list of media items from queue 800A starting at (or including) Song A. This list of media items may be referred to as a "window" and the number of media items requested may be referred to a "window size." An example window size may be 10 media items (provided that there are at least 10 media items in the playback queue), among other example sizes.

The window need not necessarily include the currently playing media item. For example, in some cases, playback at the media playback system may be stopped. In such a case, the window may include one or more media items that are ordered first in the playback queue such that they would be the first media items to playback if playback was initiated at the media playback system. Alternatively, the window may include one or more media items succeeding the currently playing media item in the playback queue.

As noted above, Song C may be removed from queue 800A, which may cause the computing system to send a notification to media playback system 610 indicating that queue 800A has been altered. Such a notification may cause playback device 612 to request a list of media items from queue 800C starting at (or including) Song C (which may be, for example, currently playing on media playback system 610). Playback device 612 may then request a list of media items from queue 800C starting at (or including) Song C. The computing system may then send the requested list of media items from queue 800C that starts at (or includes) Song C to media playback system 610.

To determine which songs to include in the window, the computing system may search for Song C (the currently playing media item). After finding Song C, the computing system may include Song C and one or more additional media items in the window. If the indication is not included in the list of media items, the computing system might not know which media items to send to playback device 612, as Song C has been removed and the computing system might be unable to find Song C when searching. To avoid this problem, the list of media items sent to media playback system 610 may include the indication in position 3 that Song C has been removed from queue 800A. After receiving the list of media items sent by the computing system, a device (e.g., playback device 612) may detect the indication in position 3 that Song C has been removed from queue 800A, and responsively remove Song C from its local copy of the playback queue.

d. Determine that More than a Threshold Number of Requests for One or More Media Items have been Received Since Adding to the Queue the Indication At block 708, the method involves determining that the computing system has received more than a threshold number of requests for one or more media items since adding to the queue the indication. For instance, the computing system may determine that the computing system has received than a threshold number of requests since adding the indication that Song C has been removed from playback queue 800C. Alternatively, the method may involve determining that the computing system has received the threshold number of requests for one or more media items since adding to the queue the indication.

The threshold number of requests may be at least one. However, a threshold that is configured at a number of requests that is greater than one may address some corner cases that may arise with a threshold that is configured at one request. For instance, as an alteration of the example above, Song C and Song D may be removed from the playback queue and replaced by indications that the respective audio items have been removed from the queue. FIG. 8D shows an example queue 800D, which represents playback queue 800B after adding the indications that Song C and Song D have been removed from queue 800B.

Removal of Song C and Song D may cause the computing system to notify media playback system 610 that queue 800A has been altered. At this time, song C may be now playing on media playback system 610. Playback device 612 may then request a list of media items from queue 800C starting at (or including) Song C. As noted above, the list of media items may include the indications in positions 3 and 4 that Songs C and D have been removed from the queue. Playback device 612 may detect such indications, and responsively remove Song C and Song D from its local copy of the playback queue. Given a threshold of one, the computing system may determine that the threshold has been reached, and remove the indications from the queue.

However, in some cases, playback of Track 3 may end before it receives the list of media items. The playback device may then request a new list of media items from queue 800D starting at (or including) Song D. If as noted above, the computing system removed the indication of Song D from the queue, the computing system might not know which media items to send to playback device 612, as Song D has been removed. To avoid situations like this, the threshold may be configured at two requests or three requests. The threshold may be configured at a higher number of requests, however, such an embodiment may use additional computing and/or network resources.

In some cases, the computing system may maintain or have access to a counter for indication (or entry) that indicates a removed media item. Based on each received request for one or media items from the queue of media items, the computing system may increment the counter associated with each indication. Then, the value of each counter may indicate a number of requests for one or media items from the queue of media items that have been received since adding the indication to the queue. Such counters may facilitate determining that the computing system has received a threshold number of requests. For instance, based on the incremented counter associated with the indication, the computing system may determine that the computing system has received a threshold number of requests for one or media items from the queue of media items since adding to the queue the entry.

e. Remove the Indication from the Queue

At block 710, the method involves removing the indication from the queue. For instance, after determining that the computing system has received more than the threshold number of requests, the computing system may remove the indications for Song C and Song D from queue 800D. Such an operation may involve removing indications from a data structure (e.g., an array or a table) that represents queue 800D. Alternatively, such an operation may involve removing a reference in queue 800D to data that indicates that Songs C and D were removed from the queue. In another example, removing the indication may involve deleting metadata (that indicates Songs C and D were removed from the queue) which could be contained in the data structure that represents the playback queue (or otherwise associated with the playback queue), perhaps in a second data structure that is referenced by the data structure that represents the playback queue.

FIG. 8E shows an example queue 800E, which represents playback queue 800D after removing the indications that Song C and Song D have been removed from the queue. As shown in FIG. 8E, the computing system may update entries 802-828 with new position numbering to reflect the current order of the Songs in the entries.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves removing a media item from a playback queue. In one aspect, a method is provided. The method may involve removing a given media item from a queue of media items. The method may further involve adding to the queue an indication that the given media item has been removed from the queue. After receiving the one or more requests, the method may also involve determining that the computing system has received more than a threshold number of requests for one or more media items since adding to the queue the indication. After determining that the computing system has received more than the threshold number of requests, the method may further involve removing the indication from the queue.

In another aspect, a device is provided. The device includes a network interface, at least one processor, a data storage, and program logic stored in the data storage and executable by the at least one processor to perform functions. The functions may include removing a given media item from a queue of media items. The functions may further include adding to the queue an indication that the given media item has been removed from the queue. After receiving the one or more requests, the functions may also include determining that the computing system has received more than a threshold number of requests for one or more media items since adding to the queue the indication. After determining that the computing system has received more than the threshold number of requests, the functions may further include removing the indication from the queue.

In yet another aspect, a non-transitory computer readable memory is provided. The non-transitory computer readable memory has stored thereon instructions executable by a computing device to cause the computing device to perform functions. The functions may include removing a given media item from a queue of media items. The functions may further include adding to the queue an indication that the given media item has been removed from the queue. After receiving the one or more requests, the functions may also include determining that the computing system has received more than a threshold number of requests for one or more media items since adding to the queue the indication. After determining that the computing system has received more than the threshold number of requests, the functions may further include removing the indication from the queue.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A method to be performed by a computing system, the method comprising:
   receiving, via a network interface, a command to remove a particular media item from a playback queue, wherein one or more playback devices of a media playback system are configured to play back media items according to the playback queue;
   based on receiving the command to remove the particular media item from the playback queue, removing the particular media item from the playback queue;
   adding, to the playback queue, a tombstone indicator indicating that the particular media item has been removed from the playback queue;
   receiving, via the network interface from the media playback system, a request for a window of one or more media items from the playback queue;
   based on receiving the request for the window, sending, via the network interface to the media playback system, data representing a particular window of media items from the playback queue, wherein the particular window includes the tombstone indicator;
   detecting a given tombstone removal trigger from among multiple tombstone removal triggers, wherein each of the multiple tombstone removal triggers causes the computing system to remove at least one tombstone when detected; and
   based on detecting the given tombstone removal trigger, removing the tombstone indicator from the playback queue.

2. The method of claim 1, further comprising:
   receiving, via the network interface from the media playback system, multiple requests for a window of media items from the playback queue, wherein detecting the given tombstone removal trigger comprises determining that a count of the multiple requests received by the computing system is at least a threshold number of requests since the tombstone indicator was added to the playback queue.

3. The method of claim 1, further comprising:
   receiving, via the network interface from the media playback system, multiple queue interactions, wherein detecting the given tombstone removal trigger comprises determining that a count of the multiple queue interactions received by the computing system is at least a threshold number of queue interactions since the tombstone indicator was added to the playback queue, and wherein a queue interaction comprises one of (a) modifying the playback queue or (b) requesting a window of media items from the playback queue.

4. The method of claim 1, wherein detecting the given tombstone removal trigger comprises detecting that a threshold period of time has elapsed since the tombstone indicator was added to the playback queue.

5. The method of claim 1, further comprising:
based on adding the tombstone indicator indicating that the particular media item has been removed from the playback queue, sending, via the network interface to the media playback system, a command to send a request for a window of media items, wherein the media playback system sends the request for the window of one or more media items from the playback queue based on receiving the command to send the request for a window of media items.

6. The method of claim 1, wherein the particular window further includes (i) a first media item that is currently playing back on the one or more playback devices, (ii) one or more second media items that precede the first media item in the playback queue and (iii) one or more third media items subsequent to the first media item in the playback queue.

7. The method of claim 1, wherein sending the data representing the particular window of media items from the playback queue comprises sending data representing respective sources of the media items in the window at one or more remote servers.

8. A system comprising one or more servers, the system configured to perform functions comprising:
receiving, via a network interface, a command to remove a particular media item from a playback queue, wherein one or more playback devices of a media playback system are configured to play back media items according to the playback queue;
based on receiving the command to remove the particular media item from the playback queue, removing the particular media item from the playback queue;
adding, to the playback queue, a tombstone indicator indicating that the particular media item has been removed from the playback queue;
receiving, via the network interface from the media playback system, a request for a window of one or more media items from the playback queue;
based on receiving the request for the window, sending, via the network interface to the media playback system, data representing a particular window of media items from the playback queue, wherein the particular window includes the tombstone indicator;
detecting a given tombstone removal trigger from among multiple tombstone removal triggers, wherein each of the multiple tombstone removal triggers causes the one or more servers to remove at least one tombstone when detected; and
based on detecting the given tombstone removal trigger, removing the tombstone indicator from the playback queue.

9. The system of claim 8, wherein the system is further configured to perform functions comprising:
receiving, via the network interface from the media playback system, multiple requests for a window of media items from the playback queue, wherein detecting the given tombstone removal trigger comprises determining that a count of the multiple requests received by the one or more servers is at least a threshold number of requests since the tombstone indicator was added to the playback queue.

10. The system of claim 8, wherein the system is further configured to perform functions comprising:
receiving, via the network interface from the media playback system, multiple queue interactions, wherein detecting the given tombstone removal trigger comprises determining that a count of the multiple queue interactions received by the one or more servers is at least a threshold number of queue interactions since the tombstone indicator was added to the playback queue, and wherein a queue interaction comprises one of (a) modifying the playback queue or (b) requesting a window of media items from the playback queue.

11. The system of claim 8, wherein detecting the given tombstone removal trigger comprises detecting that a threshold period of time has elapsed since the tombstone indicator was added to the playback queue.

12. The system of claim 8, wherein the system is further configured to perform functions comprising:
based on adding the tombstone indicator indicating that the particular media item has been removed from the playback queue, sending, via the network interface to the media playback system, a command to send a request for a window of media items, wherein the media playback system sends the request for the window of one or more media items from the playback queue based on receiving the command to send the request for a window of media items.

13. The system of claim 8, wherein the particular window further includes (i) a first media item that is currently playing back on the one or more playback devices, (ii) one or more second media items that precede the first media item in the playback queue and (iii) one or more third media items subsequent to the first media item in the playback queue.

14. The system of claim 8, wherein sending the data representing the particular window of media items from the playback queue comprises sending data representing respective sources of the media items in the window at one or more remote servers.

15. A tangible, non-transitory, computer-readable medium storing instructions that, when executed by one or more processors, cause a computing system to perform functions comprising:
receiving, via a network interface, a command to remove a particular media item from a playback queue, wherein one or more playback devices of a media playback system are configured to play back media items according to the playback queue;
based on receiving the command to remove the particular media item from the playback queue, removing the particular media item from the playback queue;
adding, to the playback queue, a tombstone indicator indicating that the particular media item has been removed from the playback queue;
receiving, via the network interface from the media playback system, a request for a window of one or more media items from the playback queue;
based on receiving the request for the window, sending, via the network interface to the media playback system, data representing a particular window of media items from the playback queue, wherein the particular window includes the tombstone indicator;

detecting a given tombstone removal trigger from among multiple tombstone removal triggers, wherein each of the multiple tombstone removal triggers causes the computing system to remove at least one tombstone when detected; and based on detecting the given tombstone removal trigger, removing the tombstone indicator from the playback queue.

16. The tangible, non-transitory, computer-readable medium of claim 15, wherein the functions further comprise:

receiving, via the network interface from the media playback system, multiple requests for a window of media items from the playback queue, wherein detecting the given tombstone removal trigger comprises determining that a count of the multiple requests received by the computing system is at least a threshold number of requests since the tombstone indicator was added to the playback queue.

17. The tangible, non-transitory, computer-readable medium of claim 15, wherein the functions further comprise:

receiving, via the network interface from the media playback system, multiple queue interactions, wherein detecting the given tombstone removal trigger comprises determining that a count of the multiple queue interactions received by the computing system is at least a threshold number of queue interactions since the tombstone indicator was added to the playback queue, and wherein a queue interaction comprises one of (a) modifying the playback queue or (b) requesting a window of media items from the playback queue.

18. The tangible, non-transitory, computer-readable medium of claim 15, wherein detecting the given tombstone removal trigger comprises detecting that a threshold period of time has elapsed since the tombstone indicator was added to the playback queue.

19. The tangible, non-transitory, computer-readable medium of claim 15, wherein the functions further comprise:

based on adding the tombstone indicator indicating that the particular media item has been removed from the playback queue, sending, via the network interface to the media playback system, a command to send a request for a window of media items, wherein the media playback system sends the request for the window of one or more media items from the playback queue based on receiving the command to send the request for a window of media items.

20. The tangible, non-transitory, computer-readable medium of claim 15, wherein the particular window further includes (i) a first media item that is currently playing back on the one or more playback devices, (ii) one or more second media items that precede the first media item in the playback queue and (iii) one or more third media items subsequent to the first media item in the playback queue.

* * * * *